(12) United States Patent
Debevec et al.

(10) Patent No.: US 8,988,599 B2
(45) Date of Patent: Mar. 24, 2015

(54) ILLUMINATION SPHERE WITH INTELLIGENT LED LIGHTING UNITS IN SCALABLE DAISY CHAIN WITH INTERCHANGEABLE FILTERS

(75) Inventors: Paul Debevec, Culver City, CA (US); Xueming Yu, Arcadia, CA (US); Mark Bolas, Mountain View, CA (US); Graham Fyffe, Los Angeles, CA (US); Jay Busch, Sherman Oaks, CA (US); Pieter Peers, Williamsburg, VA (US); Abhijeet Ghosh, London (GB)

(73) Assignee: University of Southern California, Los Angeles, CA (US)

(*) Notice: Subject to any disclaimer, the term of this patent is extended or adjusted under 35 U.S.C. 154(b) by 182 days.

(21) Appl. No.: 12/872,433

(22) Filed: Aug. 31, 2010

(65) Prior Publication Data

US 2012/0050606 A1  Mar. 1, 2012

(51) Int. Cl.
*H04N 5/222* (2006.01)
*H04N 5/225* (2006.01)
(Continued)

(52) U.S. Cl.
CPC ............ *H05B 37/0254* (2013.01); *G03B 15/07* (2013.01); *H04N 5/2256* (2013.01); *H04N 5/247* (2013.01); *H05B 33/0842* (2013.01); *H05B 33/0872* (2013.01); *H05B 37/0218* (2013.01); *G03B 2215/0557* (2013.01); *Y02B 20/46* (2013.01); *Y02B 20/48* (2013.01)
USPC ............. 348/371; 348/375; 313/112; 362/19; 315/312

(58) Field of Classification Search
USPC .......................... 348/370, 371, 375; 313/112; 359/484.01–494.01; 362/3, 11, 13, 362/16–18, 272–287, 319–324, 393; 315/312–325, 149–157; 352/45
See application file for complete search history.

(56) References Cited

U.S. PATENT DOCUMENTS

| 4,962,687 A |   | 10/1990 | Belliveau et al. |
| 5,828,500 A | * | 10/1998 | Kida et al. ................... 359/798 |

(Continued)

OTHER PUBLICATIONS

Rapid Acquisition of Specular and Diffuse Normal Maps from Polarized Spherical Gradient Illumination by Wan-Chun Ma et al; Eurographics Symposium on Rending (2007).*
(Continued)

*Primary Examiner* — Sinh Tran
*Assistant Examiner* — Mark Monk
(74) *Attorney, Agent, or Firm* — McDermott Will & Emery LLP

(57) ABSTRACT

A controllable lighting system may include a plurality of light source groups, a group controller for each light source group, a master controller, and a network communication system. Each group controller may be configured to control the light sources in its light source group based on a group control command. The master controller may be configured to receive a master control command relating to the light sources and to issue a group control command to each of the group controllers that collectively effectuate compliance with the master control command. The network communication system may be configured to communicate the group control commands from the master controller to the group controllers.

9 Claims, 7 Drawing Sheets

(51) Int. Cl.
  *H01J 5/16*  (2006.01)
  *F21V 9/14*  (2006.01)
  *H05B 37/00*  (2006.01)
  *H05B 37/02*  (2006.01)
  *G03B 15/07*  (2006.01)
  *H04N 5/247*  (2006.01)
  *H05B 33/08*  (2006.01)

(56) References Cited

U.S. PATENT DOCUMENTS

| | | | |
|---|---|---|---|
| 6,016,038 | A | 1/2000 | Mueller et al. |
| 6,150,774 | A | 11/2000 | Mueller et al. |
| 6,685,326 | B2 | 2/2004 | Debevec et al. |
| 6,788,011 | B2 | 9/2004 | Mueller et al. |
| 7,044,613 | B2 | 5/2006 | Debevec |
| 7,436,403 | B2 | 10/2008 | Debevec |
| 2007/0103893 | A1* | 5/2007 | Tanaka .......... 362/138 |
| 2007/0145915 | A1* | 6/2007 | Roberge et al. ....... 315/312 |
| 2009/0174877 | A1* | 7/2009 | Mulder et al. ........ 355/71 |

OTHER PUBLICATIONS

Levoy M. et al. 1996. Light Field Rendering. In SIGGRAPH 1996 Conference Proceedings: Computer Graphics Annual Conference Series, Addison-Wesley, publisher, pp. 31-42.

Debevec P. et al. 2000. Acquiring the Reflectance Field of a Human Face. In ACM SIGGRAPH 2000, Computer Graphics Proceedings, Annual Conference Series, Jul. 2000, pp. 145-156.

Debevec P. et al. 2002. A Lighting Reproduction Approach to Live-Action Compositing. In ACM SIGGRAPH 2002, Computer Graphics Proceedings, Annual Conference Series, Jul. 21-26, 2002, 10 pages.

Hawkins, T. et al. 2004. Animatable Facial Reflectance Fields. In Rendering Techniques 2004: 15th Eurographics Symposium on Rendering, The Eurographics Association, pp. 309-320.

Hawkins T. et al. 2005. A Dual Light Stage. In Eurographics Symposium on Rendering (2005), The Eurographics Association, 8 pages.

Einarsson, P. et al. 2006. Relighting Human Locomotion with Flowed Reflectance Fields. In Eurographics Symposium on Rendering (2006), The Eurographics Association, 12 pages.

* cited by examiner

R G B      R W R
G B R G    G B G B
R G B      W R W
  B R        G B

ILLUMINATION SPHERE WITH INTELLIGENT LED LIGHTING UNITS IN SCALABLE DAISY CHAIN WITH INTERCHANGEABLE FILTERS

STATEMENT REGARDING FEDERALLY SPONSORED RESEARCH

This invention was made with Government support under Contract No. W911NF-04-D-0005 awarded by the Army Research Office. The Government has certain rights in the invention.

CROSS-REFERENCE TO RELATED APPLICATIONS

This application is related to U.S. Pat. No. 6,685,326, entitled "REALISTIC SCENE LIGHTING SIMULATION," issued Feb. 3, 2004, and to U.S. Pat. No. 7,044,613, entitled "REALISTIC SCENE ILLUMINATION REPRODUCTION," issued May 16, 2006. The entire content of each of these patents is incorporated herein by reference.

BACKGROUND

1. Technical Field

This disclosure relates to lighting systems, including lighting systems used for postproduction and facial scanning, and to lighting systems in the shape of a geodesic sphere.

2. Description of Related Art

Lighting systems may be used during postproduction, facial scanning, and in other applications. Lighting systems in the shape of a geodesic sphere may be particularly useful, as described in U.S. Pat. No. 7,436,403, entitled "PERFORMANCE RELIGHTING AND REFLECTANCE TRANSFORMATION WITH TIME-MULTIPLEXED ILLUMINATION," issued Oct. 14, 2008, the entire content of which is incorporated herein by reference.

These lighting systems may use a large number of light sources. It can be challenging to control all of them in a coordinated fashion to achieve a particular effect, without very powerful and costly processing systems and/or problematic delays while configurations are being changed. The complexity of these systems can give rise to other challenges, such as complex wiring, overheating and other malfunctions, calibrating brightness, providing a high dynamic range, and quickly changing the color, brightness, or polarization of the lights.

SUMMARY

A controllable lighting system may include a plurality of light source groups, a group controller for each light source group, a master controller, and a network communication system. Each group controller may be configured to control the light sources in its light source group based on a group control command. The master controller may be configured to receive a master control command relating to the light sources and to issue a group control command to each of the group controllers that collectively effectuate compliance with the master control command. The network communication system may be configured to communicate the group control commands from the master controller to the group controllers.

The network communication system may connect the master controller and each of the group controllers in a daisy chain.

Each group controller may have a unique network address. The master controller may be configured to address each group control command to at least one of the network addresses. The group controller may include a set of DIP switches. The network address of each group controller may be governed by the setting of its DIP switches.

The master controller may be configured to sequentially issue the group control commands to the group controllers. Each group controller may be configured to receive a group control command and to thereafter implement the received group control command upon the subsequent receipt of a master synchronization signal. The master controller may be configured to issue the master synchronization signal following the sequential issuance of all of the group control commands.

Each group controller may be configured to turn off any light source that has a temperature in excess of a threshold.

Each group controller may be configured to deliver information to the master controller relating to the light sources controlled by the group controller. The information may relate to the temperature of the light sources, a malfunction in the light sources, and/or to any other matter.

Each group controller may include firmware. The master controller may be configured to deliver firmware upgrades to each group controller. Each group controller may be configured to automatically install the firmware upgrades received from the master controller.

Each group controller may be bootable and may include a boot loader. The boot loader may be configured to test for the delivery of a firmware upgrade from the master controller during bootup. Upon detection of a firmware upgrade from the master controller during bootup, the boot loader may be configured to replace the firmware in the group controller with the firmware upgrade.

The network communication system may include a firmware upgrade signal line configured to signal the presence of a firmware upgrade. The master controller may be configured to send a firmware upgrade signal on the firmware upgrade signal line when the master controller has a firmware upgrade to deliver to at least one of the group controllers. The firmware upgrade signal may include the address of one or more group controllers. Each boot loader may be is configured to test for the delivery of a firmware upgrade from the master controller during bootup by sensing a firmware upgrade signal on the firmware upgrade signal line addressed to it.

Each group controller may include a brightness calibration circuit configured to calibrate the brightness of each of its light sources based on feedback relating to that brightness. The feedback may be based on a voltage generated by a resistance in series with a current that is delivered to each light source. The brightness calibration circuit may be configured to compensate for temperature drift.

Each light source group may include at least one photo sensor configured to detect the intensity of light emitted by a different light source group, such as an opposing light source group. The feedback for each light source group may be based on the signal from the photo sensor which detects the intensity of light from that light source group.

The each group controller may include a digital-to-analog converter (DAC) configured to convert a digital input signal to an analog output signal that ranges between a low analog input voltage and a high analog input voltage. A driver may be configured to drive a light source at an intensity that is based on the analog output signal of the DAC. A reference signal generator may be configured to generate the low and the high analog input voltages and the digital input signal to the DAC. These may have values which cause the resulting intensity of the light source to substantially match the intensity represented by a digital command signal. The range of intensity represented by the high and the low analog input voltages may be a subset of the range of intensity which the light sources can be driven to provide by the driver. At least one pulse width modulator and low pass filter may be configured to generate the high and the low analog input voltages based on the digital command signal.

The master control command may specify an intensity, color, and/or polarization for the light sources. Each of the group controllers may be configured to control the intensity, color, and/or polarization of each of their light sources based on the group control command. The master controller may be configured to issue a group control command to each of the group controllers which causes the intensity, color, and/or polarization of the light sources to substantially conform to the intensity, color, and/or polarization specified by the master control command.

The controllable lighting system may include a filter associated with each light source and a controller configured to cause each filter to be controllably interposed into or removed from a path of light emanating from its associated light source in conformance with a group command signal.

Each filter may be a polarization filter. The light sources in each light source group may be arranged such that filtered light output from each light source is added to the others. The polarization controller may be configured to control the filters for the light sources in each group so as to cause the polarization of the added-together filtered light from each light source group to substantially conform to a polarization specified in a group control command. The controllable lighting system may include a motor configured to controllably rotate the orientation of each filter so as to control the angle of the polarization.

Each filter may be a color filter. Four light sources in each group may be filtered with a red filter, four with a green filter, and four with a blue filter. Three light sources in each group may be re filtered with a red filter, three with a green filter, three with a blue filter, and three with a white filter. The white filter may be implemented with no filter at all.

The filters may be held in place by one or more magnets. Each magnetic connection to a filter may also conduct electrical power to the filter.

Each light source group may include at least one red, green and blue LED. The red, green, and blue LEDs may be together in a single compact package.

The controllable lighting system may include a frame to which each light source group is attached, cause the light sources to collectively form a geodesic sphere.

Each light source group may include at least one photo sensor configured to detect the intensity of light emitted by a different light source group.

Each light source group may include a camera configured to capture an image of an object that is illuminated by the light source group.

Each light source group may include a projector configured to project an image on an object that is illuminated by the light source group. Each group controller may be configured to control the projector in its light source group based on a group control command. The master controller may be configured to generate the group control command for each group controller based on the master control command.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings illustrate illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details which may be apparent or unnecessary may be omitted to save space or for a more effective presentation. Some embodiments may be practiced with additional components or steps and/or without all of the components or steps which are described.

Figure 1:
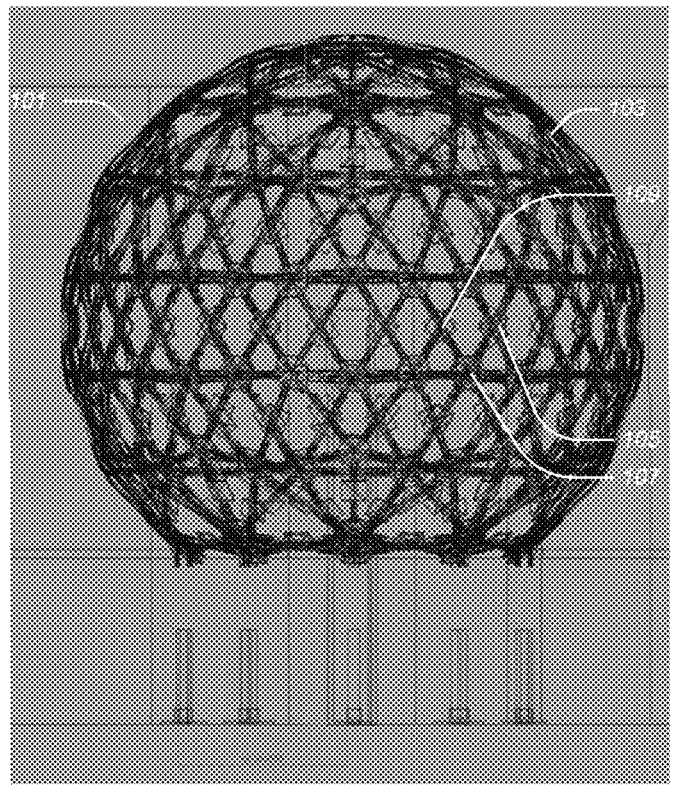
FIG. 1 illustrates a controllable lighting system which includes a geodesic lighting sphere containing a dense array of controllable light sources arranged in light source groups.

FIG. 1 illustrates a controllable lighting system which includes a geodesic lighting sphere containing a dense array of controllable light sources arranged in light source groups. As illustrated in FIG. 1, a geodesic lighting sphere 101 may include a frame 103 to which a plurality of light source groups are attached, such as light source groups 105, 107, and 109. Each light source group may contain a plurality of light sources clustered together. The frame 103 may be configured such that light source groups collectively form a geodesic sphere with the light from each light source being directed to the approximate center of the sphere. Some of the light source groups at the bottom of the geodesic lighting sphere may be omitted to permit a person to stand within the sphere. Legs may in addition or instead be placed under the sphere.

Figure 2:
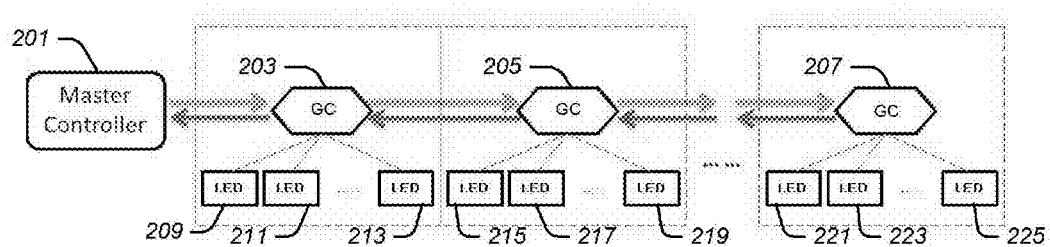
FIG. 2 illustrates a controllable lighting system with a master controller and a set of group controllers, each controlling a group of light sources, connected in a daisy chain.

FIG. 2 illustrates a controllable lighting system with a master controller and a plurality of group controllers, each controlling a group of light sources, connected in a daisy chain. As illustrated in FIG. 2, a master controller 201 may communicate with a plurality of group controllers, such as group controllers 203, 205, and 207, which, in turn, may each control a group of light sources. For example, lights sources 209, 211, and 213 may be under the control of group controller 203; lights sources 215, 217, and 219 may be under the control of group controller 205, and lights sources 221, 223, and 225 may be under the control of group controller 207.

The light sources may be of any type. For example, they may be LEDs, as illustrated in FIG. 2. They may instead be incandescent bulbs, fluorescent bulbs, or any other type of light source.

Each group controller may be configured to control the intensity of each of its light sources in any way. For example, each group controller may be configured to driving each light source with a periodic pulse having a width that is a function of the desired intensity. In addition or instead, each group controller may be configured to adjust the voltage on each light source to achieve the desired intensity.

Each group controller may be configured to control its light sources group based on a group control command. The group control command may specify any number of a broad array of criteria relating to the entire light source group and/or each of its individual light sources. The criteria may include such things as intensity, color, diffusion, and/or polarization. A group control command may also specify a time at which the change dictated by the command should be initiated, as well as any other criteria or set of criteria.

The master controller 201 may be configured to receive a master control command relating to the light sources and to issue a group control command to each of the group controllers that collectively effectuate compliance with the master control command. Like the group control commands, the master control command may specify any number of criteria for the light sources, either on an individual basis, a group basis, and/or on a global basis. Like the group control commands, the master control command may specify any type of lighting criteria, such as intensity, color, diffusion, and/or polarization. The master control command may be the result of a information delivered to the master controller from a remote source, such as a remote computer, and/or directly from a user who may enter information relating to the master control command into the master controller through a user interface, which may include devices such as a keyboard, mouse, display, touch screen, and/or switches.

A network communication system may be configured to communicate the group control commands from the master controller to the group controllers. The network communication system may be configured to communicate information from the group controllers back to the master controller. The network communication system may be configured to communicate information between group controllers.

The network communication system may be of any type and may have any topology. For example, the network communication system may include wired and/or wireless links. The network communication system may connect the master controller 201 with each of the group controllers in a daisy chain. The daisy chain may be effectuated by using two daisy chain connectors in the master controller and in each of the group controllers. The two connectors in each controller may be connected to the same signal lines, thus enabling the number of group controllers to easily be expanded or contracted. The connectors may handle any number of signal lines, such as two, three or four.

Each group controller, in turn, may use a star topology to control each of its light sources with a processing system at the hub.

The processing system in each group controller may contain one or more on-board microprocessors configured with associated support devices and interfaces to perform the functions of the group controller which are recited herein. Similarly, the master controller may contain one or more on-board microprocessors configured with associated support devices and interfaces to perform the functions of the master controller which are recited herein.

Each group controller may be configured to have a unique network address. To facilitate this, each group controller may have a set of DIP switches, the settings of which may govern the network address of the group controller. The master controller 201 may be configured to address each group control command to one, some or all of these network addresses.

The master controller may be configured to sequentially issue the group control commands to the group controllers. In turn, each group controller may be configured to receive a group control command, but not to thereafter implement the received group control command until the subsequent receipt of a master synchronization signal. The master controller may be configured to issue the master synchronization signal following the sequential issuance of all of the group control commands. In this way, a wide variety of diverse changes can be sequentially commanded, while all being subsequently implemented at the same time.

The light sources may each be configured to accept one or more interchangeable filters. This may allow different light sources to be filtered independently. This may allow applications such as full-color light output or polarimetric ellipsometry to be performed. The filters may instead be removed entirely allowing the light sources to be driven together for maximum intensity output. The filters may be attached with either screws or magnets. The mounting posts may be electronically active, allowing for motorized filters to be attached, e.g., to rotate a linear polarizer to a specific angle. Examples of these are discussed below.

The light sources may be densely arranged, enabling reflectance field data sets to be captured, as described in more detail in *Acquiring the Reflectance Field of a Human Face*, Proceedings of ACM SIGGRAPH 2000, Computer Graphics Proceedings, Annual Conference Series, July 2000, pp. 145-156 (hereinafter "Debevec 2000") and *Animatable Facial Reflectance Fields*, Rendering Techniques 2004: 15th Eurographics Workshop on Rendering, June 2004, pp. 309-320 (hereinafter "Hawkins 2004"). The interchangeable filters may also enable the performance of light reproduction functions of the Light Stage Three system described in *A Lighting*

*Reproduction Approach to Live-Action Composing*, ACM Transactions on Graphics, 21(3), July 2002, pp. 547-556 (hereinafter "Debevec et al. 2002").

Figure 3:
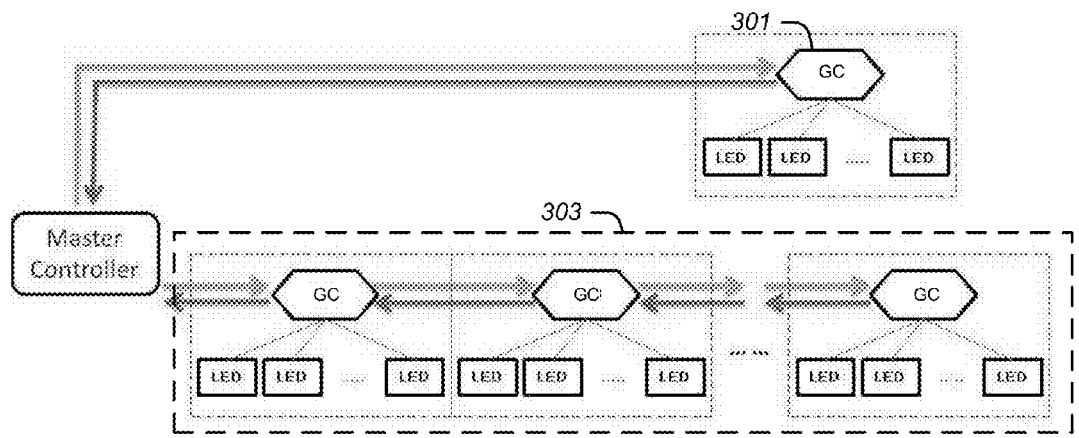
FIG. 3 illustrates a controllable lighting system with a master controller and a set of group controllers, each controlling a group of light sources, connected in a star topology with one of the legs forming a daisy chain.

FIG. 3 illustrates a controllable lighting system with a master controller and a set of group controllers, each controlling a group of light sources, connected in a star topology with one of the legs forming a daisy chain. The topology of the network communication system illustrated in FIG. 3 is the same as what is illustrated in FIG. 2, except that a remote group controller 301 in its light source group is connected to the master controller in a star topology, with one leg of the star communicating with the remote group controller 301 and the other leg communicating with the other group controllers 303 in a daisy chain configuration. This configuration may be useful when the group controller 301 and its associated light source group is located remotely from the others group controllers 303.

Figure 4:
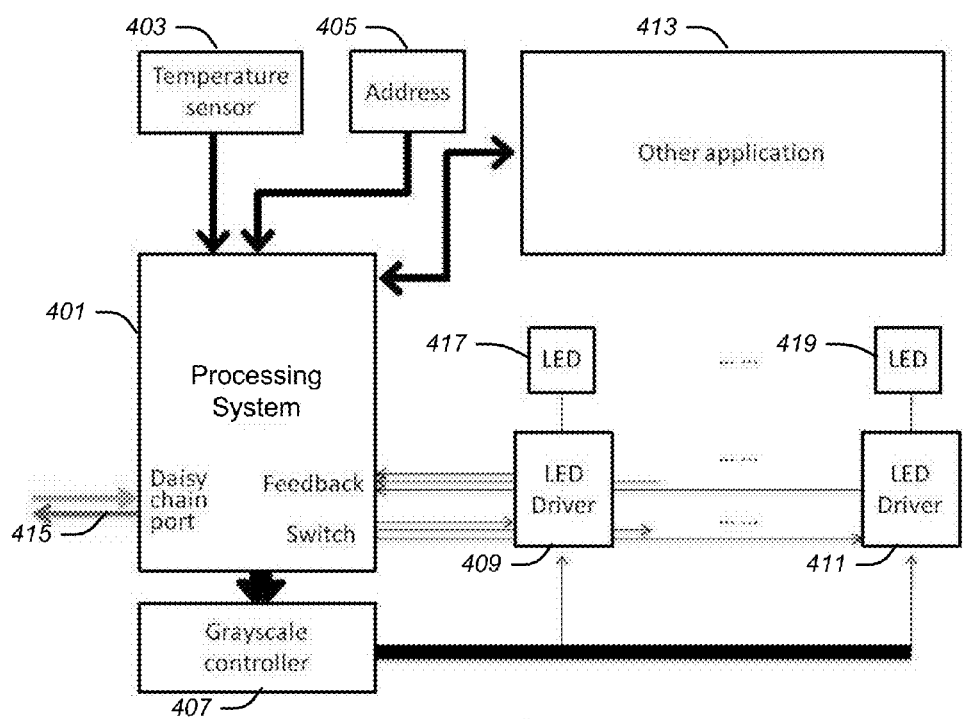
FIG. 4 illustrates a group controller and its associated light source group.

FIG. 4 illustrates a group controller and its associated light source group. As illustrated in FIG. 4, a group controller may include a processing system 401, a temperature sensor 403, a network address configurator 405, a grayscale controller 407, a driver for each light source, such as drivers 409 and 411 for light sources 417 and 419, and other application 413.

The processing system 401 may be configured to receive each group control command from a daisy chain port 415 and to perform the function or functions dictated by that command. For example, the processing system 401 may be configured to turn each light source on or off in accordance with the command and/or to control the intensity of the light source through the grayscale controller 407.

The temperature sensor 403 may be configured to sense the temperature of the light source. The processing system 401 may be configured to turn off the light sources if the temperature sensor 403 indicates a temperature in excess of a threshold.

The processing system 401 may be configured to deliver information to the master controller through the daisy chain port 415 relating to the light sources which it controls. The processing system 401 may be configured to deliver and receive information from other group controllers, also through the daisy chain port 415.

The information which the processing system 401 receives or delivers may be of any type. For example, the processing system 401 may be configured to deliver information to the master controller relating to the temperature of the light sources. The master controller may then decide to direct the processing system 401 to turn off the light sources as a consequence and/or to report any problem which is perceived to an operator of the master controller. Similarly, the processing system 401 may be configured to detect and report any malfunction in the light sources, such as a light source which has burnt out or is drawing too much current. Again, the master controller may be configured to determine what action to take as a consequence of the report, such as to shut down a malfunctioning light source and/or to report the problem to an operator.

A defect in a light source may be detected by the processing system 401 monitoring the current which is being delivered to light source in view of the voltage which is applied. If no current flows with an applied voltage, this may indicate that the light source has burnt out. If too much current is flowing, this may also indicate a malfunction in the light source.

The other application 413 may be configured to assist the group controller in performing the function described herein, as well as other functions.

The processing system 401 may include firmware and may go through a boot up process before it is ready to receive and process group control commands from the master controller. The master controller, in turn, may be configured to deliver firmware upgrades to each group controller. Each group controller, in turn, may be configured to automatically install the firmware upgrade which it receives from the master controller.

The processing system 401 may include a boot loader, which may be a software program, configured to facilitate this firmware upgrade. The boot loader program, for example, may test for the delivery of a firmware upgrade from the master controller during boot up. Upon detection of a firmware upgrade from the master controller during boot up, the boot loader program may replace the firmware in the group controller with the firmware upgrade.

The network communication system may include a firmware upgrade signal line configured to signal the presence of a firmware upgrade. The master controller may be configured to send a firmware upgrade signal on the firmware upgrade signal line when the master controller has a firmware upgrade to deliver to at least one of the group controllers. The firmware upgrade signal may include the address of each group controller which is to have its firmware upgraded with a firmware upgrade that will be sent next. Each boot loader program may be configured to test for the delivery of a firmware upgrade from the master controller during boot up by sensing a firmware upgrade signal on the firmware upgrade signal line addressed to its group controller. The master controller may be configured to thereafter deliver a different firmware upgrade to each group controller. There may instead be no line dedicated to the firmware upgrade signal.

Figure 5:
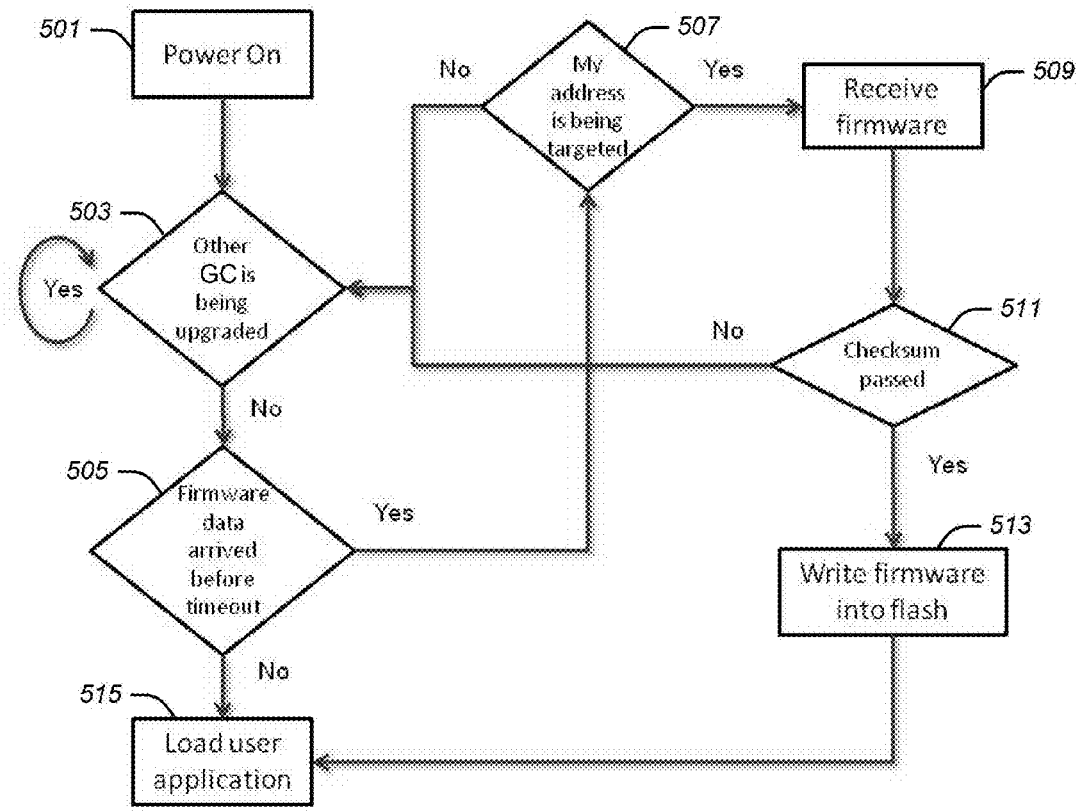
FIG. 5 is a flow diagram of a process which a boot loader program in a group controller may implement to upgrade firmware in the group controller.

FIG. 5 is a flow diagram of a process which a boot loader program in a group controller may implement to upgrade firmware in the group controller. Power to the group controller may be turned on, as reflected by a Power On step 501. The boot loader program may then check to see whether a different group controller is currently being upgraded, as reflected by an Other GC Is Being Upgraded decision step 503. If so, the boot loader program may wait until this upgrade is finished. Otherwise, the boot loader program may check to see whether firmware has arrived before a timeout period which may be part of the bootup process, as reflected by a Firmware Data Arrive Before Timeout decision step 505. As part of this step, the boot loader program may check to see whether the master controller has sent a firmware upgrade signal on the firmware upgrade signal line. If firmware has arrived prior to the timeout, the boot loader program may check to see whether the firmware is intended for its group controller, as opposed to another group controller, as reflected by a My Address Is Being Targeted decision step 507. If not, the boot loader program may again wait to see whether its address is being targeted before the timeout. If so, the boot loader program may then receive the firmware upgrade, as reflected by a Receive Firmware step 509. The integrity of the firmware upgrade may next be checked, as reflected by a Checksum Passed decision step 511. If the received firmware passes the integrity test, the firmware upgrade may be loaded into the group controller, such as into a flash memory in the group controller, as reflected by a Write Firmware Into Flash step 513. An application program may then be loaded, as reflected by a Load User Application step 515.

Figure 6:
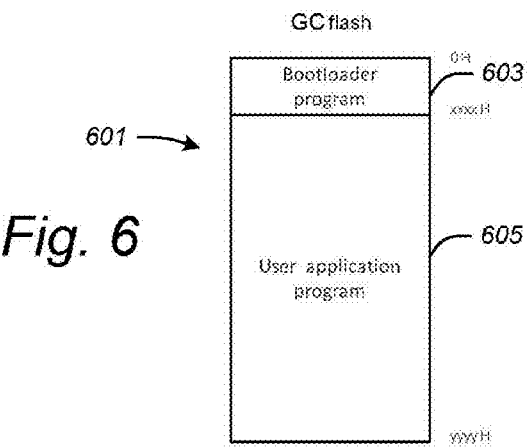
FIG. 6 illustrates an arrangement of programs within a flash memory within a group controller.

FIG. 6 illustrates an arrangement of programs within a flash memory within a group controller. As illustrated in FIG. 6, each group controller may include a flash memory 601 which may store a boot loader program 603 at the base of the memory, followed by a user application program 605.

The user application program 605 may be part of the processing system 401 and may be configured to receive and implement the group control commands from the master controller, to deliver status information to the master controller and/or other group controllers, and/or to receive and process status information from other group controllers and/or the master controller. The user application program 605 may be or include the firmware which is upgraded.

Each group controller may include a brightness calibration circuit which may be configured to calibrate the brightness of each light source. This calibration may be based on feedback relating to that brightness.

Figure 7:
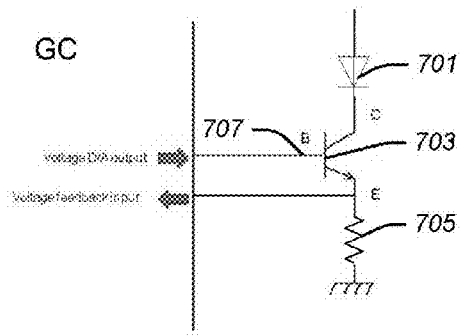
FIG. 7 illustrates a brightness feedback circuit which may be employed by a group controller to calibrate the brightness of each light source.

FIG. 7 illustrates a brightness feedback circuit which may be employed by a group controller to calibrate the brightness of each light source. As illustrated in FIG. 7, each light source, such as an LED 701, may be controlled by an electronic switch or valve, such as by a transistor 703. In series with the current flow may be a resistance, such as a resistor 705. The voltage across this resistance may thus be reflective of the amount of current which is traveling through the light source, such as the LED 701. If the instantaneous and/or average current is above or below what is expected, the drive to the switch or valve, such as the signal on a base 707 of the transistor 703, may be adjusted to compensate.

The intensity of a light source may vary due to temperature changes, even though the current to the light source is the same. The intensity of each light source may be calibrated to compensate for such temperature changes. For example, the processing system in the group controller may be configured to compensate for such temperature changes by detecting the temperature of the light source, and by adjusting the drive signal to the light source accordingly. The adjustment may be derived from a temperature compensation table contained within the processing system and/or by a temperature-compensating algorithm.

Figure 8:
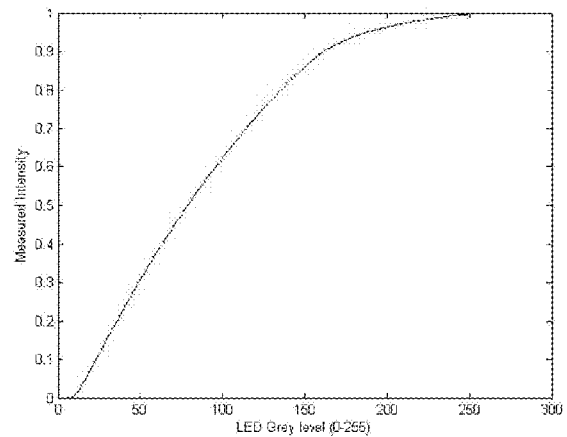
FIG. 8 is a graph illustrating the intensity of an LED as a function of the output of an 8 bit digital-to-analog converter.

FIG. 8 is a graph illustrating the intensity of an LED as a function of the output of an 8 bit digital-to-analog converter (DAC). As illustrated in FIG. 8, the curve may not be not linear. Thus, a small change at the lower end of the scale may yield a much larger difference in intensity than the same small change at the upper end of the scale. This can make it difficult to make fine adjustments to the intensity of the light source at the lower end of the scale without increasing the number of bits in the DAC, which can be costly.

Figure 9:
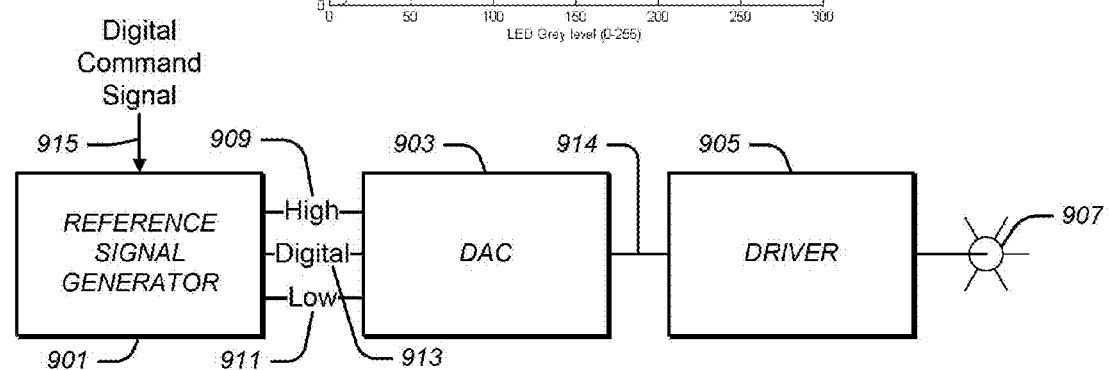
FIG. 9 is a block diagram of a circuit that drives a light source with a high dynamic range of intensities using only a low dynamic range digital-to-analog converter.

FIG. 9 is a block diagram of a circuit that drives a light source with a high dynamic range of intensities using only a low dynamic range DAC. As illustrated in FIG. 9, a DAC 903 may be configured to convert a digital input signal 913 into an analog output signal 914 that ranges between a low analog input voltage 911 and a high analog input voltage 909. A driver 905 may be configured to drive the light source 907 at an intensity that is based on the analog output signal 914 of the DAC 903.

A reference signal generator 901 may be configured to generate the low and the high analog input voltages 909 and 911 and the digital input signal 913 to the DAC. The reference signal generator 901 may be configured to cause these values to collectively cause the resulting intensity of the light source to substantially match the intensity represented by a digital command signal 915. The range of intensity represented by the high and the low analog input voltages 909 and 911 may be a subset of the range of intensity which the driver 905 can drive the light source to produce.

For example, the driver 905 may be configured to receive an analog output signal 914 from the DAC 903 that ranges between a low of 0 and a maximum of 10 volts and to deliver current to the light source 907 in a proportional amount. The digital command signal 915 may call for an intensity represented by an analog output signal 914 of 1.3 volts. The reference signal generator 901 may as a consequence generate a low analog input voltage 911 to the DAC 903 of zero volts, a high analog input voltage 909 to the DAC 903 of two volts, and a digital input signal 913 to the DAC 903 having a value of 192 (for a 256 bit DAC). This may cause the intensity of the light source 907 to closely match the intensity called for by the digital command signal 915, all without requiring a very high resolution and expensive DAC.

The same system may instead receive a digital command signal 915 which seeks to drive the light source at an intensity represented by an analog output voltage of 5.3 volts. In this configuration, the reference signal generator 901 may generate a low analog input voltage 911 to the DAC 903 of 4 volts, a high analog input voltage 909 to the DAC 903 of 6 volts, and a digital input signal 913 to the DAC 903 of 166. This again may cause the intensity of the light source to closely match the intensity called for by the digital command signal 915, again without requiring a very high resolution and expensive DAC.

The difference between the high and the low analog input voltages 909 and 911 which are generated by the reference signal generator 901 may vary depending upon the desired intensity level. At low intensity levels, for example, a small change in the analog output signal 914 may yield a large change in output intensity. So the reference signal generator 901 may be configured to make the difference between the high and the low analog input voltages 909 and 911 small when the desired intensity level is low. Conversely, at high desired intensity levels, a small difference in the analog output signal 914 may yield only a small change in output intensity. So the reference signal generator 901 may be configured to make the difference between the high and the low analog input voltages 909 and 911 large when the desired intensity is high.

Figures 10A, 10B, 10C, 10D:
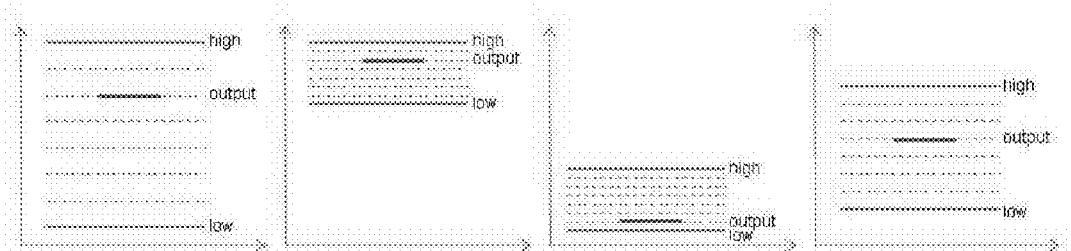
FIGS. 10A-10D illustrate different intensity resolutions that may be achieved with the circuit illustrated in FIG. 9.

FIGS. 10A-10D illustrate different intensity resolutions that may be achieved with the circuit illustrated in FIG. 9. FIG. 10A illustrates a resolution of intensity levels which may be achieved when the low and high analog input voltages are set to cover the maximum possible range. FIG. 10B illustrates a higher resolution which may be achieved by the same DAC when the high and the low input voltages are both set to a high level. FIG. 10C illustrates a higher resolution which may be achieved by the same DAC when the high and the low analog input voltages are both set to a low level. FIG. 10D illustrates an intermediate resolution which may be achieved with the same DAC when the high and the low analog input voltages are set further apart, but less than their extremes.

The reference signal generator 901 may use any type of circuit for generating the high and the low analog input voltages.

Figure 11:
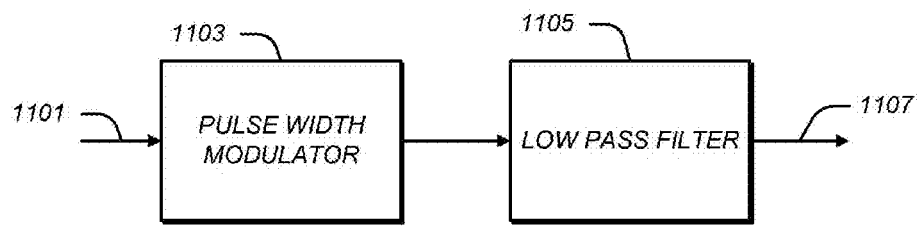
FIG. 11 is a block diagram of a circuit which may be used to generate the high and the low analog input voltages illustrated in FIG. 9.

FIG. 11 is a block diagram of a circuit which may be used to generate the high and the low analog input voltages illustrated in FIG. 9. As illustrated in FIG. 11, a digital signal 1101 representative of a desired analog voltage 1107 may be delivered to an input of a pulse-width modulator 1103. The digital signal 1101 may be generated by a group controller and/or by the master controller. The pulse-width modulator 1103 may be configured to generate a periodic pulse having a width which is proportional to the weight of the digital signal 1101 at the input. The periodic pulse from the pulse-width modulator 1103 may be delivered to a low-pass filter 1105. The low-pass filter 1105 may be configured to filter the periodic pulse to produce the analog voltage 1107 at its output having the desired level. One instance of the circuit illustrated in FIG. 11 may be used to generate the high analog input voltage 909, while another instance may be used to generate the low analog input voltage 911. Conversely, a single instance may be used to generate both. An analog latch may be used to store one value while the other is generated.

Figure 12:
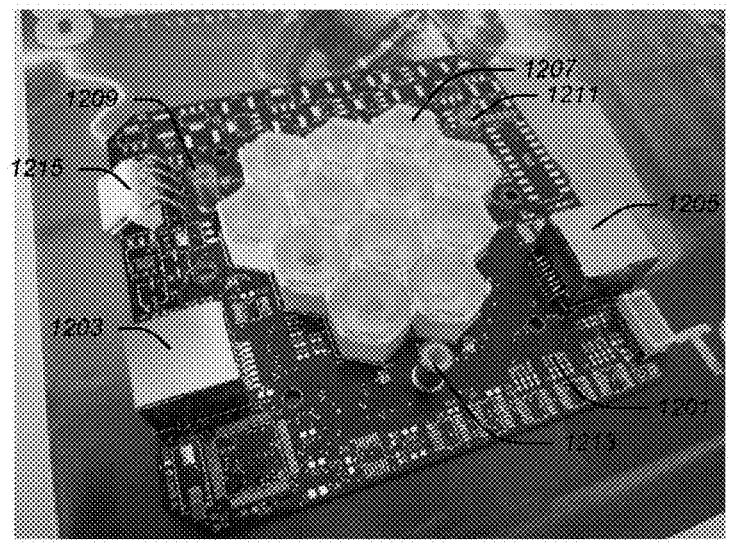
FIG. 12 illustrates a group controller and a set of light sources which it controls.

FIG. 12 illustrates a group controller and a set of light sources which it controls. As illustrated in FIG. 12, a group controller may include a printed circuit board 1201 (shown without many of its components). RJ-45 female connectors 1203 and 1205 may be mounted on the circuit board 1201 and may serve to receive corresponding RJ-45 male connectors. The pins in both connectors may be routed, respectively, to the same signals. This may make it easy to chain several group controllers in a daisy chain by simply connecting a connector of one to a connector in another.

A cluster of light sources 1207 may be mounted to the circuit board 1201. Electronically-active posts 1209, 1211, and 1213 may serve as to anchor a filter assembly, which may be held in place by screws, magnetically, and/or by other means. The same post may also serve to conduct electrical power and/or signals to the filter assembly, when needed by the array.

Each of the light sources 1207 may be an LED configured to generate a white light. The filter assembly may include an individual filter for each light source which may be configured to produce a particular color, polarization, and/or diffusion. The filtered output of all of the light sources 1207 may combine to product a particular color, polarization, and/or diffusion, coupled with appropriate control of their relative intensities.

Appropriate electrical components, such as one or more microprocessors, memories, network communication devices, DACs, etc., may be soldered to the circuit board 1201. A power connector 1215 may be provided to receive power which powers the electrical components and/or the light sources 1207.

Figures 13A, 13B, 14:
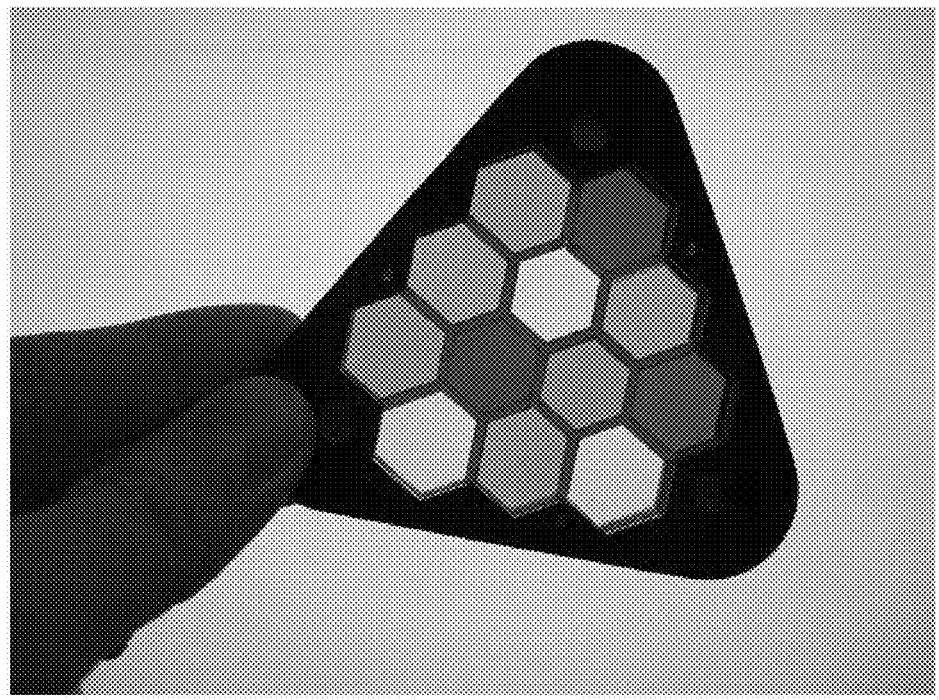
FIGS. 13A and 13B illustrate different configurations of color filters that may be used for the light sources illustrated in FIG. 12.
FIG. 14 illustrates a polarimetry filter assembly that may be used to filter the light sources illustrated in FIG. 12.

FIGS. 13A and 13B illustrate different configurations of color filters that may be used for the light sources illustrated in FIG. 12. As illustrated in FIG. 13A, some of the light sources may be filtered with a red filter, some with a green filter, and some with a blue filter. FIG. 13B is similar, except that some of the light sources are also filtered with a white filter, which may simply be no filter at all when the light source itself is a white light source. By controlling the intensity of the light sources which are filtered, colored illumination spanning a three-dimensional gamut may be produced, allowing the light reproduction technique described in Debevec et al. 2002 to be employed.

As reflected in FIGS. 13A and 13B, the light filters may have a symmetrical orientation with an optimally consistent location of their centroids. FIG. 13B divides the light sources into four symmetrical groups of three LED's for each color, while also maintaining symmetry and optimally consistent centroids. The inclusion of white (clear) filters in FIG. 13B may allow for a brighter total light output with reduced color saturation.

The filters which are placed over each light source may be colored and gel filters, dichroic filters, linear polarizers at various orientations, circular polarizers, wave plates, diffusers, defraction gradings, lenticular lenses, holographic diffusers, light-shaping diffusers, or any combination of these. The filters may interchangeably attached so that different filters may be switched in and out for different effects. The interchangeable filters may be configured to be stacked upon one another so as to provide additional combinations of filtration.

FIG. 14 illustrates a polarimetry filter assembly that may be used to filter the light sources illustrated in FIG. 12. The filter assembly illustrated in FIG. 14 may include three angles of linear polarization, plus right circular polarization distributed evenly over twelve light sources. A different number of light sources may instead be used. An LCD monitor may provide polarized backlight for differentiating the filters. Three magnets may be positioned at the corners of the filter to magnetically attach the filter assembly to the posts 1209, 1211, and 1213 illustrated in FIG. 12.

As noted above, the post 1209, 1211, and 1213 in FIG. 12 may be used to carry electricity to the filter assembly. This may be used, for example, to actuate a motor, solenoid, or other device which may apply or remove one or more of the filters from the light path of a light source.

Figure 15:
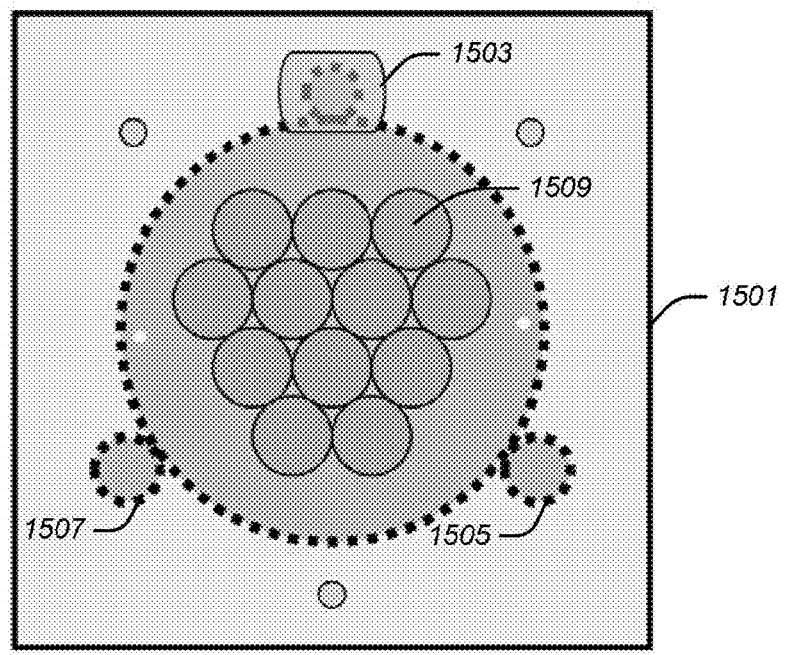
FIG. 15 illustrates a motorized polarizer filter assembly which may be used to adjust the polarization of the light sources illustrated in FIG. 12.

FIG. 15 illustrates a motorized polarizer filter assembly which may be used to adjust the polarization of the light sources illustrated in FIG. 12. As illustrated in FIG. 15, a filter assembly 1501 may include a stepping motor (not shown) which may be configured to drive one or more gears, such as gears 1503, 1505, and 1507, to controllably rotate a set of polarizers 1509 to a desired angular position. A position sensor may be provided to detect the angular position of the polarizers 1509 so that it can be rotated to a precise position as part of a feedback loop.

The controller for the filters may be more complex. For example, solenoids may be used to controllably flip up or down one or more filters into the light path of each light source. The filters may filter color, polarimetry, motorized linear polarization, circular polarization, diffusion, etc. Controlling the composition of multi-layered filters with solenoids may allow the lighting system to be used for many different purposes during the same screening by quickly changing the filters during the shoot, as needed, minimizing the risk that a subject might move.

Figure 16:
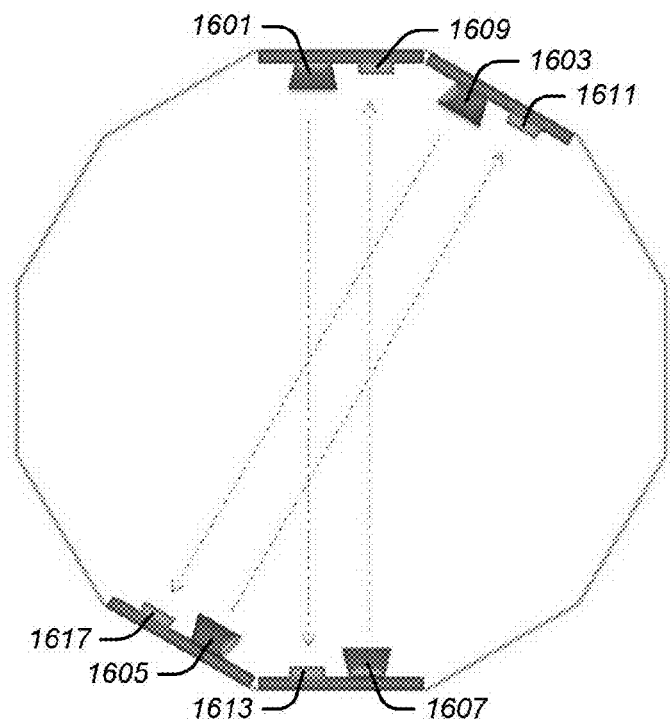
FIG. 16 illustrates a cross-section of a geodesic sphere of light source groups and their associated group controllers in which a light sensor is included with each light source group and its associated controller.

FIG. 16 illustrates a cross-section of a geodesic sphere of light source groups and their associated group controllers in which a light sensor is included with each light source group and its associated controller. As illustrated in FIG. 16, each light source group, such as light source groups 1601, 1603, 1605, and 1607, may have a light sensor clustered with them, such as light sensors 1609, 1611, 1613, and 1615. Each light sensor may be configured with appropriate shielding to receive only the light from the light source group which is directly across from it on the geodesic sphere. For example, the light source sensor 1609 may be configured to only receive the light from the light source group 1607, the light source sensor 1611 may be configured to only receive the light from the light source group 1605, the light source sensor 1613 may be configured to only receive the light from light source group 1601, and the light source sensor 1617 may be configured to only receive the light from the light source group 1603.

Each light source sensor may, in conjunction with appropriate processing circuitry, be configured to measure and digitize a high-dynamic range of light falling upon it, such as from 0 to 64,000 lux. The information from each light sensor may be used by its associated group controller to enable the group controller to provide brightness compensation to the opposing group of light sources, based on the intensity detected by the light sensor. The light sensor may also be sensitive to color and/or polarization, enabling additional types of feedback control.

The group controllers may be configured to send light intensity information to the master controller. A light-intensity-distribution-nodes graph may be synthesized after the master controller receives the data from all of the controllers.

These light sensors may be used to capture 4D reflectance fields using the reciprocity property of light transport of the "Dual Light" technology, as described in more detail in Hawkins, Einarsson, and Debevec, "A Dual Light Stage," Eurographics Symposium on Rendering 2005.

In addition to or instead of white lights, one or more RGB lights, such as RGB colored LEDs, may be used as the light sources to generate colored lighting environment, such as those used in the work of Debevec et al. "*A Lighting Reproduction Approach to Live-Action Compositing,*"in SIGGRAPH 2002. Each RGB LED may include three colored sub-LEDs (e.g., a red, a green, and a blue one) packaged tightly together. This structure may ensure that each RGB LED generates full-colored lighting with minimal color separation. All of the RGB LEDs may be controlled by their respective group controller which, in turn, may be daisy-chained to and controlled by the master controller. The use of RGB colored lights may allow colored illumination to be achieved without color filters within the visible spectrum and with additional spectral detail.

A video camera and/or a video projector may in addition or instead be mounted along with each light source group and controlled by its associated group controller and, in turn, by the master controller. The master controller may be configured to address any camera and/or projector in the network by communicating with its group controller through the issuance of an appropriate group control command. The group control command may include camera and/or projector triggers and/or shooting/projecting parameters. Images captured by the camera may, in turn, be returned to the master controller under the control of its respective group controller. The master controller may be configured to trigger multiple cameras/projectors simultaneously.

Each camera may be equipped with memory and digital signal process capability. The memory may be configured to function as a buffer between the camera and the group controller, holding one or more shots of image data temporarily before they are transferred out through the daisy-chain. The group controller may be configured to pre-process raw image data that is captured directly by a camera. Data pre-processing may help reduce the data size to expedite transfer of image information to the master controller. The group controller may provide on-board process capability to reformat the raw image data into other standards, such as HDR.

The projector may function in a reverse way. The projector may receive static-image or video data from the master controller and store it in a memory before displaying it. The master controller may be configured to cause multiple projectors to trigger simultaneously. When included along with the camera, the projector and camera may share the same memory and DSP.

Having a camera with each light source group (or with a subset of them) may allow a 4D light field of an object to be captured so that it may be re-rendered from any 3D viewpoint through image-based modeling and rendering techniques, such as those discussed by Levoy et al, in "*Light Field Rendering,*"SIGGRAPH 1996, or Einarsson et al. in "*Relighting Human Locomotion,*" Euroqraphics Symposium on Rendering 2006, in the form of a Flowered Light Field.

Having a projector with each light source group (or with subset of them) may allow 4D illumination patterns to be produced, with an arbitrary 3D image being projected over the object from any direction. This may allow reflectance acquisition techniques which record 8D reflectance fields or employ compressive sensing techniques.

The components, steps, features, objects, benefits and advantages which have been discussed are merely illustrative. None of them, nor the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

For example, the various sub-systems which have been discussed may be used independent of the master controller/group controller lighting system topology which has been discussed. For example, the interchangeable light filters which have been discussed may be used in systems which have only a single light source group, or only a single light source. Similarly, the technology which facilitates a high dynamic range of intensities using only a low dynamic range DAC may be used in any type of lighting system. The concept of distributing firmware upgrades from a master controller to a set of slave controllers may similarly be used in any type of distributed processing system, not merely one that is part of a lighting system. And still further, the brightness calibration technology may be used in connection with any type of lighting system, not merely one which employs a master and slave controllers.

The camera and projector which have been discussed may be deployed in a distributed camera array and/or distributed projector array independent of the lighting system.

Unless otherwise stated, all measurements, values, ratings, positions, magnitudes, sizes, and other specifications which are set forth in this specification, including in the claims which follow, are approximate, not exact. They are intended to have a reasonable range which is consistent with the functions to which they relate and with what is customary in the art to which they pertain.

All articles, patents, patent applications, and other publications which have been cited in this disclosure are incorporated herein by reference.

The phrase "means for" when used in a claim is intended to and should be interpreted to embrace the corresponding structures and materials which have been described and their equivalents. Similarly, the phrase "step for" when used in a claim is intended to and should be interpreted to embrace the corresponding acts which have been described and their equivalents. The absence of these phrases in a claim mean that the claim is not intended to and should not be interpreted to be limited to any of the corresponding structures, materials, or acts or to their equivalents.

None of the claims are intended to embrace non-statutory subject matter, such as an abstract idea, law of nature or natural phenomena; obvious subject matter; or subject matter lacking novelty; nor should they be interpreted in such a way. Any unintended embracement of such subject matter is hereby disclaimed.

Except as otherwise stated immediately above, nothing which has been stated or illustrated is intended or should be interpreted to cause a dedication of any component, step, feature, object, benefit, advantage, or equivalent to the public, regardless of whether it is recited in the claims.

The scope of protection is limited solely by the claims which now follow. That scope is intended and should be interpreted to be as broad as is consistent with the ordinary meaning of the language which is used in the claims when interpreted in light of this specification and the prosecution history which follows and to encompass all structural and functional equivalents.

The invention claimed is:

1. A controllable lighting system comprising multiple light source groups, each light source group including:

multiple light sources;

a polarization filter oriented to filter light emitted by each of the light sources, but not to filter light emitted by the other light sources, wherein:

each polarization filter polarizes light in a way that is different from the way the other polarization filters polarize light; and the light sources and their associated polarization filters are oriented so as to cause light from each polarization filter to be added to light from the other polarization filters, thereby creating a consolidate light having a polarization that is a function of the different polarizations of the different polarization filters and the intensity of the light from each of the light sources; and a controller that:

receives different polarization control signals, each indicative of a different desired polarization of light from the light source group; and in response to each of the different received polarization control signals, sets the intensity of each of the light sources within the light source group to an amount that causes the consolidated light from all of the filtered light sources to have the desired polarization indicated by the polarization control signal, wherein the orientation of each polarization filter is not changed by the controller at least between the time each polarization control signal is received by the controller and the time the controller sets the intensity of each of the light sources to the amount that causes the consolidated light from all of the filtered light sources to have the desired polarization.

2. The controllable lighting system of claim 1 wherein the angle of polarization of one of the polarization filters is different than the angle of polarization of another of the polarization filters.

3. The controllable lighting system of claim 1 wherein there are at least three light sources and at least three polarization filters.

4. The controllable lighting system of claim 3 wherein there are at least four light sources and at least four polarization filters.

5. The controllable lighting system of claim 4 wherein one of the polarization filters provides a circular polarization.

6. The controllable lighting system of claim 1 wherein each controller is a slave controller and wherein each polarization control signal is a slave polarization control signal, and further comprising a master controller that:

receives a master polarization control signal indicative of one of several different desired light polarizations; and causes a slave polarization control signal to be delivered to each of the slave controllers indicative of the desired light polarization indicated by the master polarization control signal.

7. The controllable lighting system of claim 1 wherein the multiple light source groups are distributed throughout the interior surface of a geodesic lighting sphere and oriented to direct their light towards the center of the geodesic lighting sphere.

8. A controllable lighting system comprising multiple light source groups, each light source group including:

at least two polarization filters;

multiple light sources, each providing a light source output; and a control system that controls the intensity of each of the multiple light sources, wherein:

at least two of the light sources, but not all of the light sources, are each filtered by one of the at least two polarization filters;

the outputs of all of the light sources are directed so as to substantially combine to form a consolidated light source output; and the control system has a configuration that:

receives first information indicative of a first polarization that the consolidated light source output should have and controls the intensity of each of the light sources so as to cause the consolidated light source output to have the first polarization without changing the orientation of the at least one polarization filter between the time the first information is received and the time that the control system causes the consolidated light source output to have the first polarization; and receives second information indicative of a second polarization that is different than the first polarization that the consolidated light source output should have and controls the intensity of each of the light sources so as to cause the consolidated light source output to have the second polarization, again without changing the orientation of the at least one polarization filter between the time the second information is received and the time that the control system causes the consolidated light source output to have the first polarization.

9. The controllable lighting system of claim 8 wherein at least one of the light sources comprises multiple light sources.

* * * * *